Patented Sept. 22, 1953

2,653,150

UNITED STATES PATENT OFFICE 2,653,150

MORPHOLINE AZO DYESTUFFS

Mordecai Mendoza, Blackley, Manchester, England, assignor to Imperial Chemical Industries Limited, a corporation of Great Britain No Drawing. Application July 16, 1951, Serial No. 237,073. In Great Britain August 3, 1950

4 Claims. (Cl. 260—152)

This invention relates to new azo dyestuffs and more particularly it relates to new disazo dyestuffs useful in dyeing leather in brown shades.

According to the invention I provide new disazo dyestuffs of the formula:

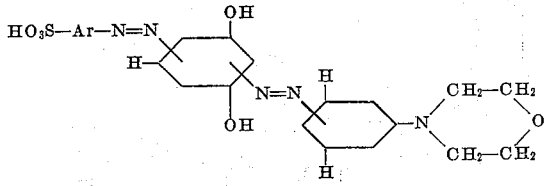

wherein Ar stands for an aromatic residue of the benzene or naphthalene series which optionally may bear substituents.

According to a further feature of the invention I provide a process for the manufacture of the said new disazo dyestuffs which comprises coupling one molecular proportion of a diazotised arylamine monosulphonic acid with one molecular proportion of resorcinol in a medium which is acid to litmus and coupling with the so-produced monoazo compound in alkaline medium one molecular proportion of a diazotised ortho- or para-aminophenyl-morpholine.

The said new dyestuffs dye vegetable-, mordant- or semichrome-tanned leather in brown shades of good strength and of excellent stability towards acids and alkalis.

The invention is illustrated but not limited by the following examples in which the parts are by weight.

Example 1

A solution of 7 parts of sodium nitrite in 50 parts of water is added to a stirred suspension of 17.3 parts of sulphanilic acid in a mixture of 300 parts of water and 25 parts of a 36% aqueous solution of hydrochloric acid at room temperature. To the suspension so formed there is added a solution of 11 parts of resorcinol in 250 parts of water containing also 45 parts of hydrated sodium acetate and stirring at room temperature is continued for 4 hours in litmus acid medium. The mixture is cooled to below 5° C. and an aqueous solution of the diazonium chloride obtained from 17.8 parts of o-aminophenylmorpholine is added to it. Caustic soda solution is added in amount sufficient to make the mixture alkaline to glazed red litmus paper and the mixture is stirred for 12 hours. Sufficient common salt to make a 20% brine is then added followed by hydrochloric acid to make the reaction neutral. The precipitated disazo dyestuff is filtered off, dried and ground. The dark brown powder so obtained is soluble in water and the solution dyes leather in reddish tan brown shades of good all round properties of fastness.

If in place of the o-aminophenyl morpholine used in the process of the above example there is used p-aminophenylmorpholine the resulting disazo dyestuff yields greener shades on leather of similar good properties.

Structurally, the dyestuffs prepared according to the foregoing may be shown by the following formula:

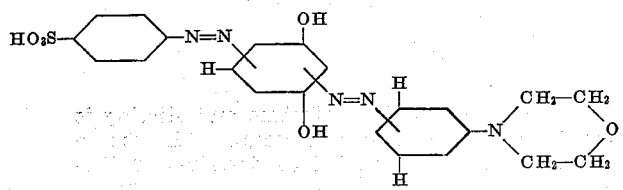

Example 2

A solution of 7 parts of sodium nitrite in 50 parts of water is added at room temperature to a stirred suspension of 22.3 parts of 1-naphthylamino-4-sulphonic acid in a mixture of 300 parts of water and 25 parts of a 36% aqueous solution of hydrochloric acid and to the resulting suspension is added a solution of 11 parts of resorcinol in 100 parts of water. Sodium acetate is added to the mixture until the mineral acid reaction no longer persists and stirring is continued for about 6 hours. The suspension so obtained is cooled to 5° C. and the aqueous solution of the diazonium chloride obtained from 17.8 parts of p-aminophenylmorpholine is added. Caustic soda solution is added in amount sufficient to make the reaction of the mixture alkaline and stirring is continued for about 12 hours. The disazo dyestuff formed is isolated in manner similar to that described in Example 1 and it dyes leather in red-brown shades of good fastness properties. It may be structurally represented by the following formula:

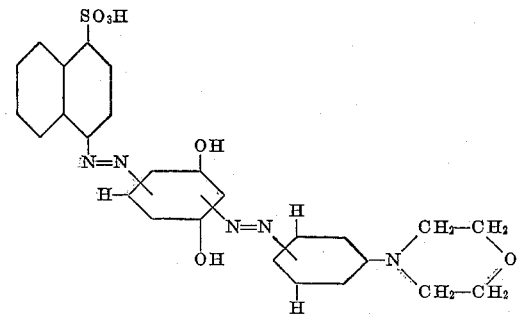

Example 3

A solution of 7 parts of sodium nitrite in 50 parts of water is added at room temperature to a stirred suspension of 23.3 parts of 3-amino-6-hydroxy-5-sulphobenzoic acid in a mixture of 300 parts of water and 25 parts of a 36% aqueous solution of hydrochloric acid and to the mixture there is added a solution of 11 parts of resorcinol in 100 parts of water. Sodium acetate is added to the mixture until the mineral acid reaction no longer persists and stirring is continued for about 12 hours. The suspension so obtained is cooled to 5° C. and the aqueous solution of the diazonium chloride obtained from 17.8 parts of o-aminophenylmorpholine is added. Caustic soda solution is added in amount sufficient to make the reaction of the mixture alkaline and stirring is continued for a further 12 hours. The disazo dyestuff formed is isolated as described in Example 1. It gives yellowish tan brown shades on leather of good fastness properties and may be represented by the following structural formula:

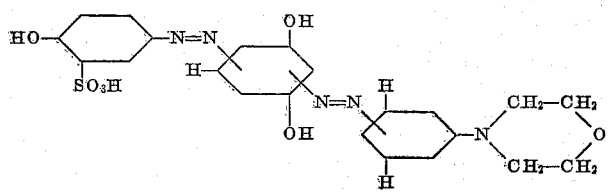

What I claim is:

1. Disazo dyestuffs of the formula:

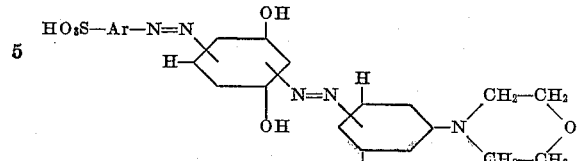

wherein Ar stands for a radical selected from the group consisting of mono- and dicyclic aryl radicals of the benzene and naphthalene series.

2. Disazo dyestuffs of the formula:

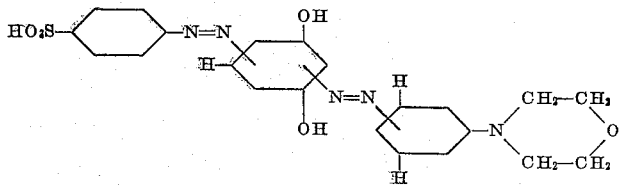

3. Disazo dyestuffs of the formula:

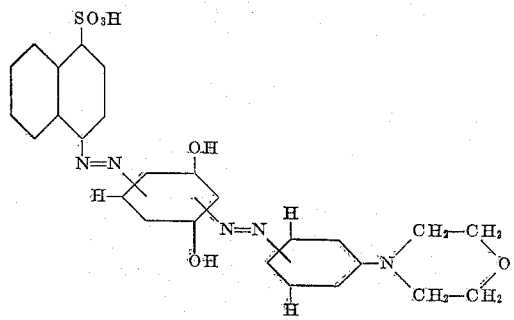

4. Disazo dyestuffs of the formula:

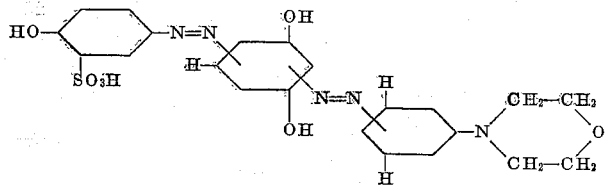

MORDECAI MENDOZA.

References Cited in the file of this patent

UNITED STATES PATENTS

| Number | Name | Date |
|---|---|---|
| 2,269,218 | McNally et al. | Jan. 6, 1942 |